United States Patent
Yamamoto et al.

(10) Patent No.: US 10,128,493 B2
(45) Date of Patent: Nov. 13, 2018

(54) NEGATIVE ELECTRODE ACTIVE MATERIAL, NEGATIVE ELECTRODE AND BATTERY

(71) Applicant: NIPPON STEEL & SUMITOMO METAL CORPORATION, Tokyo (JP)

(72) Inventors: Sukeyoshi Yamamoto, Nishinomiya (JP); Noriyuki Negi, Kisarazu (JP); Tatsuo Nagata, Ikeda (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/115,920

(22) PCT Filed: Feb. 25, 2015

(86) PCT No.: PCT/JP2015/000952
§ 371 (c)(1),
(2) Date: Aug. 2, 2016

(87) PCT Pub. No.: WO2015/129265
PCT Pub. Date: Sep. 3, 2015

(65) Prior Publication Data
US 2017/0170461 A1    Jun. 15, 2017

(30) Foreign Application Priority Data
Feb. 25, 2014   (JP) .................................. 2014-034277

(51) Int. Cl.
*H01M 4/36* (2006.01)
*C22C 9/02* (2006.01)
(Continued)

(52) U.S. Cl.
CPC .............. *H01M 4/364* (2013.01); *C22C 9/02* (2013.01); *H01M 4/38* (2013.01); *H01M 4/387* (2013.01);
(Continued)

(58) Field of Classification Search
CPC ................................... H01M 4/134; B22F 9/04
(Continued)

(56) References Cited

U.S. PATENT DOCUMENTS

| | | | |
|---|---|---|---|
| 2004/0023116 A1* | 2/2004 | Fujino | H01M 4/134 429/231.95 |
| 2004/0091775 A1* | 5/2004 | Nishino | B22F 9/04 429/218.1 |

(Continued)

FOREIGN PATENT DOCUMENTS

| | | |
|---|---|---|
| EP | 2889936 | 7/2015 |
| JP | 2007-165061 | 6/2007 |

(Continued)

OTHER PUBLICATIONS

Hu et al., "Sn buffered by . . . lithium ion batteries", Acta Materialia, (Jun. 29, 2012) pp. 4695-4703.

*Primary Examiner* — Khanh T Nguyen
(74) *Attorney, Agent, or Firm* — Clark & Brody

(57) ABSTRACT

Provided is a negative electrode active material which can improve discharge capacity per amount and charge-discharge cycle characteristics. The negative electrode active material of the present embodiment contains at least one of material A and material B, and material C:

material A: carbonaceous powder material in which a ratio of a peak intensity at 1360 $cm^{-1}$ with respect to a peak intensity at 1580 $cm^{-1}$ in the Raman spectrum is not more than 0.5;

material B: carbonaceous powder material in which a ratio of a peak intensity at 1360 $cm^{-1}$ with respect to a peak intensity at 1580 $cm^{-1}$ in the Raman spectrum is more than 0.5;

material C: powder material whose main component is an active substance made up of an alloy phase. This alloy (Continued)

phase undergoes thermoelastic diffusionless transformation when releasing metal ions or occluding the metal ions.

6 Claims, 4 Drawing Sheets

(51) Int. Cl.
  *H01M 4/38* (2006.01)
  *H01M 4/587* (2010.01)
  *H01M 4/62* (2006.01)
  *H01M 10/052* (2010.01)
  *H01M 10/0525* (2010.01)
  *H01M 4/02* (2006.01)

(52) U.S. Cl.
  CPC ........... *H01M 4/587* (2013.01); *H01M 4/625* (2013.01); *H01M 10/052* (2013.01); *H01M 10/0525* (2013.01); *H01M 2004/027* (2013.01); *Y02T 10/7011* (2013.01)

(58) Field of Classification Search
  USPC .......................................... 429/218.1, 231.95
  See application file for complete search history.

(56) References Cited

U.S. PATENT DOCUMENTS

| | | | |
|---|---|---|---|
| 2004/0191630 A1* | 9/2004 | Kawamura | ........... H01M 4/134 |
| | | | 429/231.95 |
| 2007/0105017 A1* | 5/2007 | Kawase | ................ H01M 4/134 |
| | | | 429/218.1 |
| 2008/0233479 A1 | 9/2008 | Sung et al. | |

FOREIGN PATENT DOCUMENTS

| | | |
|---|---|---|
| JP | 2008-186732 | 8/2008 |
| JP | 2010-161078 | 7/2010 |
| KR | 10-2009-0009053 | 1/2009 |

* cited by examiner

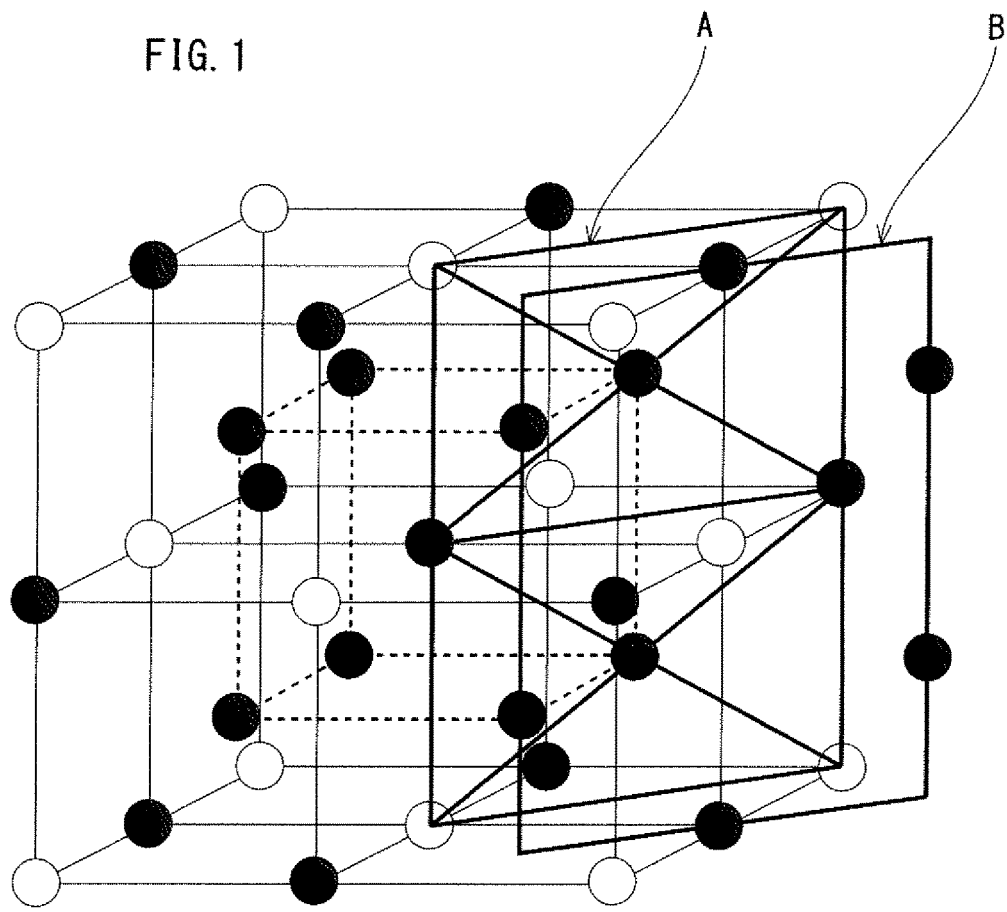

NEGATIVE ELECTRODE ACTIVE MATERIAL, NEGATIVE ELECTRODE AND BATTERY

TECHNICAL FIELD

The present invention relates to an electrode active material, and more particularly to a negative electrode active material.

BACKGROUND ART

Recently, small electronic appliances such as home video cameras, note PCs, and smart phones have become widespread, and attaining higher capacity and longer service life of batteries has become a technical problem.

Given that hybrid vehicles, plug-in hybrid vehicles, and electric vehicles will be further spread, size reduction of batteries is also a technical problem.

At present, graphite-based negative electrode active materials are utilized for lithium ion batteries. However, graphite-based negative electrode active materials have technical problem as described above.

Accordingly, alloy-based negative electrode active materials have gained attention, which have higher capacity than those of the graphite-based negative electrode active materials. As an alloy-based negative electrode active material, silicon (Si)-based negative electrode active materials and tin (Sn)-based negative electrode active materials are known. To realize a lithium ion battery having a smaller size and a longer life, various studies have been conducted on the above described alloy-based negative electrode active materials.

However, an alloy-based negative electrode active material repeatedly undergoes large expansion and contraction in volume at the time of charging/discharging. For that reason, the capacity of the alloy-based negative electrode active material is prone to deteriorate. For example, a volume expansion/contraction ratio of graphite associated with charging is about 12%. In contrast, the volume expansion/contraction ratio of Si single substance or Sn single substance associated with charging is about 400%. For this reason, if a negative electrode plate of Sn single substance is repeatedly subjected to charging and discharging, significant expansion and contraction occur, thereby causing cracking in negative electrode mixture which is applied on the current collector of the negative electrode plate. Consequently, the capacity of the negative electrode plate sharply decreases. This is chiefly caused by the fact that some of the active substances are freed due to volume expansion/contraction and thereby the negative electrode plate loses electron conductivity.

US2008/0233479A (Patent Literature 1) proposes a method for solving the above described problem of an alloy-based negative electrode active material. To be specific, the negative electrode material of Patent Literature 1 includes a Ti—Ni superelastic alloy, and Si particles formed in the superelastic alloy. Patent Literature 1 describes that a large expansion/contraction change of Si particle which occur following occlusion and release of lithium ions can be suppressed by a superelastic alloy.

CITATION LIST

Patent Literature

Patent Literature 1: US2008/0233479A

However, the charge-discharge cycle characteristics of the secondary battery in Patent Literature 1 are likely not to be sufficiently improved by the technique disclosed therein. Most of all, it is highly difficult to actually produce the negative electrode active material proposed by Patent Literature 1.

SUMMARY OF INVENTION

It is an objective of the present invention to provide a negative electrode active material which is to be used in nonaqueous electrolyte secondary batteries typified by a lithium ion secondary battery, and can improve the discharge capacity per mass and/or charge-discharge cycle characteristics thereof.

Solution to Problem

The negative electrode active material of the present embodiment contains material A and material C.

Material A: carbonaceous powder material in which a ratio of a peak intensity at 1360 $cm^{-1}$ with respect to a peak intensity at 1580 $cm^{-1}$ in the Raman spectrum is not more than 0.5.

Material C: powder material whose main component is an active substance made up of an alloy phase. This alloy phase undergoes thermoelastic diffusionless transformation when releasing metal ions or occluding the metal ions.

When the negative electrode active material contains material A, the mass ratio of material A/material C is 0.01 to 7.

The negative electrode active material of the present embodiment can improve the discharge capacity per mass and/or the charge-discharge cycle characteristics.

BRIEF DESCRIPTION OF DRAWINGS

FIG. 1 is a perspective view of $DO_3$ structure.

DESCRIPTION OF EMBODIMENTS

Figure 2A:
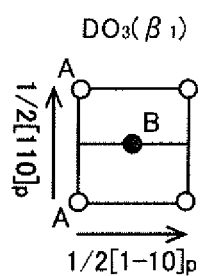
FIG. 2A is a schematic diagram of $DO_3$ structure of the matrix phase of the alloy phase of the present embodiment.

Hereinafter, with reference to the drawings, embodiments of the present invention will be described in detail. Like parts or corresponding parts in the drawings are given a like reference symbol and description thereof will not be repeated.

The negative electrode active material according to the present embodiment contains a material A and a material C.

Material A: carbonaceous powder material in which a ratio of a peak intensity at 1360 $cm^{-1}$ with respect to a peak intensity at 1580 $cm^{-1}$ in the Raman spectrum is not more than 0.5.

Material C: powder material whose main component is an active substance made up of an alloy phase. This alloy phase undergoes thermoelastic diffusionless transformation when releasing metal ions or occluding the metal ions.

When the negative electrode active material contains material A, the mass ratio of material A/material C is 0.01 to 7.

A "negative electrode active material" referred herein is preferably a negative electrode active material for nonaqueous electrolyte secondary batteries. A "thermoelastic diffusionless transformation" referred herein means so-called thermoelastic martensitic transformation. A "metal ion" refers to, for example, a lithium ion, magnesium ion, sodium ion, and the like. A preferable metal ion is lithium ion.

This material C may contain other phases different from the above described alloy phases. The other phases include, for example, a silicon (Si) phase, a tin (Sn) phase, other alloy phases (alloy phases which do not undergo thermoelastic diffusionless transformation) excepting the above described alloy phases, and the like.

Preferably, the above described alloy phases are main components (main phases) of the material C. "Main component" refers to a component which occupies not less than 50% by volume. The alloy phase may contain impurities to the extent that the spirit of the present invention is unimpaired. However, the impurities are contained preferably as little as possible.

A negative electrode formed of a negative electrode active material of the present embodiment has a higher discharge capacity (discharge capacity per mass) than that of a negative electrode made of graphite, when used in a nonaqueous electrolyte secondary battery. Further, a nonaqueous electrolyte secondary battery using a negative electrode containing a negative electrode active material of the present embodiment has a higher capacity retention ratio than one using a conventional alloy-based negative electrode. Therefore, the negative electrode active material is highly likely to sufficiently improve the charge-discharge cycle characteristics of the nonaqueous electrolyte secondary battery. Moreover, the nonaqueous electrolyte secondary battery which uses a negative electrode containing the negative electrode active material of the present embodiment has a small irreversible capacity.

A possible reason why the capacity retention ratio is high is that strain due to expansion/contraction that occurs in material C at the time of charging/discharging is relaxed by thermoelastic diffusionless transformation. Moreover, the fact that at least material A is mixed in material C may also increase the capacity retention ratio. Further, the fact that material A is mixed with material C may decrease the irreversible capacity (increase the initial Coulomb efficiency). Details will be described later.

Material A is a carbonaceous material with a high graphitization degree (that is, a graphite-based carbonaceous material). On the other hand, material B is a low crystalline carbonaceous material. The peak at 1360 $cm^{-1}$ of the Raman spectrum is a peak of low crystalline carbonaceous material, and the peak at 1580 $cm^{-1}$ is a peak of graphite-base carbonaceous material. It is meant that as the 1360 $cm^{-1}$/1580 $cm^{-1}$ peak intensity ratio of carbonaceous material increases, the graphitization degree of that material decreases (becomes low crystalline). On the contrary, it is meant that the smaller the peak intensity ratio, the higher the graphitization degree.

The above described negative electrode active material may further contain material B.

Material B: Carbonaceous powder material in which a ratio of a peak intensity at 1360 $cm^{-1}$ with respect to a peak intensity at 1580 $cm^{-1}$ in the Raman spectrum is more than 0.5.

When the negative electrode active material contains material B, the mass ratio of material B/(material A+material B+material C) is preferably 0.01 to 0.2.

The alloy phase in the material C may be of any one of the following types 1 to 4.

The alloy phase of type 1 undergoes thermoelastic diffusionless transformation when occluding metal ions, and undergoes reverse transformation when releasing metal ions. In this case, the alloy phase is a matrix phase in a normal state.

The alloy phase of type 2 undergoes reverse transformation when occluding metal ions, and undergoes thermoelastic diffusionless transformation when releasing metal ions. In this case, the alloy phase is a martensite phase in a normal state.

The alloy phase of type 3 undergoes supplemental deformation (slip deformation or twin deformation) when occluding metal ions, and returns to the original martensite phase when releasing metal ions. In this case, the alloy phase is a martensite phase in a normal state.

The alloy phase of type 4 transforms from a martensite phase to another martensite phase when occluding metal ions, and returns to the original martensite phase when releasing metal ions. In this case, the alloy phase is a martensite phase in a normal state.

In the case of the alloy phase of type 1, preferably, the crystal structure of the alloy phase after thermoelastic diffusionless transformation is either of 2H, 3R, 6R, 9R, 18R, M2H, M3R, M6R, M9R, and M18R in the Ramsdell notation, and the crystal structure of the alloy phase after reverse transformation is $DO_3$ in the Strukturbericht notation. More preferably, the crystal structure of the alloy phase after thermoelastic diffusionless transformation is the above described 2H, and the crystal structure of the alloy phase after reverse transformation is the above described $DO_3$.

In the case of the alloy phase of type 1, preferably, the alloy phase contains Cu and Sn, and also contains the above described 2H structure after thermoelastic diffusionless transformation, and the above described $DO_3$ structure after reverse transformation.

The above described alloy phase may contain one or more selected from the group consisting of Ti, V, Cr, Mn, Fe, Co, Ni, Zn, Al, Si, B, and C, and Sn, with balance being Cu and impurities.

The above described alloy phase may contain one or more selected from the group consisting of δ phase of F-Cell structure, ε phase of 2H structure, η' phase of monoclinic crystal, and a phase having $DO_3$ structure, each including site deficiency.

All of these δ phase, ε phase, η' phase, and phase having $DO_3$ structure, each including site deficiency form a storage site and a diffusion site of metal ions (Li ions, etc.) in the negative electrode active material. Thereby, the discharge capacity and the cycle characteristics of the negative electrode active material are further improved.

In the above described negative electrode active material, a volume expansion ratio or volume contraction ratio of a unit cell of the above described alloy phase before and after the phase transformation is preferably not more than 20%, and more preferably not more than 10%. The volume expansion ratio of unit cell is defined by the following Formula (1), and the volume contraction ratio of unit cell is defined by the following Formula (2).

(Volume expansion ratio of unit cell)=[(volume of unit cell when metal ions are occluded)−(volume of unit cell when metal ions are released)]/(volume of unit cell when metal ions are released)×100    (1)

(Volume contraction ratio of unit cell)=[(volume of unit cell when metal ions are occluded)−(volume of unit cell when metal ions are released)]/(volume of unit cell when metal ions are occluded)×100    (2)

The volume of unit cell at the time of releasing, which corresponds to a crystal lattice range of unit cell at the time of occluding, is substituted into "volume of unit cell when metal ions are released" in Formulas (1) and (2).

The above described negative electrode active material can be used as active material for making up an electrode, particularly electrode of a nonaqueous electrolyte secondary battery. An example of the nonaqueous electrolyte secondary battery is a lithium ion secondary battery.

Hereinafter, negative electrode active materials according to the present embodiment will be described in detail.

<Negative Electrode Active Material>

A negative electrode active material relating to an embodiment of the present invention contains material A and material C.

Material A: Carbonaceous powder material in which a ratio of a peak intensity at 1360 cm$^{-1}$ with respect to a peak intensity at 1580 cm$^{-1}$ in the Raman spectrum is not more than 0.5.

Material C: Powder material whose main component is an active substance made up of an alloy phase.

Preferably, the alloy phase of material C undergoes thermoelastic diffusionless transformation when releasing metal ions or occluding metal ions.

The thermoelastic diffusionless transformation is also called as thermoelastic martensitic transformation. Hereinafter, in the present description, the thermoelastic martensitic transformation is simply referred to as "M transformation" and the martensite phase as "M phase". An alloy phase that undergoes M transformation when occluding or releasing metal ions is also referred to as a "specific alloy phase".

The above described negative electrode active material may further contain material B.

Material B: carbonaceous powder material in which a ratio of a peak intensity at 1360 cm$^{-1}$ with respect to a peak intensity at 1580 cm$^{-1}$ in the Raman spectrum is more than 0.5.

(I) Material C

Preferably, material C is powder material having a specific alloy phase. The specific alloy phase is dominantly made up of at least one of M phase and a matrix phase. The specific alloy phase repeats occlusion/release of metal ions at the time of charging/discharging. Then, the specific alloy phase undergoes M transformation, reverse transformation, supplemental deformation, etc. in response to occlusion and release of metal ions. These transformation behaviors mitigate strain which is caused by expansion and contraction of the alloy phase when occluding and releasing metal ions.

The specific alloy phase may be of any one of the above described types 1 to 4. Preferably, the specific alloy phase is of type 1. That is, the specific alloy phase preferably undergoes M transformation when occluding metal ions, and undergoes reverse transformation when releasing metal ions.

The crystal structure of the specific alloy phase is not specifically limited. If the alloy phase is of type 1, and the crystal structure of the specific alloy phase (that is, a matrix phase) after reverse transformation is $\beta_1$ phase (DO$_3$ structure), the crystal structure of the specific alloy phase (that is, M phase) after M transformation is, for example, $\beta_1'$ phase (M18R$_1$ structure of monoclinic crystal or 18R$_1$ structure of orthorhombic crystal), $\gamma_1'$ phase (M2H structure of monoclinic crystal or 2H structure of orthorhombic crystal), $\beta_1''$ phase (M18R$_2$ structure of monoclinic crystal or 18R$_2$ structure of orthorhombic crystal), $\alpha_1'$ phase (M6R structure of monoclinic crystal or 6R structure of orthorhombic crystal), and the like.

If the crystal structure of the matrix phase of the specific alloy phase is $\beta_2$ phase (B2 structure), the crystal structure of M phase of the specific alloy phase is, for example, $\beta_2'$ phase (M9R structure of monoclinic crystal or 9R structure of orthorhombic crystal), $\gamma_2'$ phase (M2H structure of monoclinic crystal or 2H structure of orthorhombic crystal), and $\alpha_2'$ phase (M3R structure of monoclinic crystal or 3R structure of orthorhombic crystal).

If the matrix phase of the alloy phase has a face-centered cubic lattice, the crystal structure of M phase of the alloy phase has, for example, a face-centered tetragonal lattice, and a body-centered tetragonal lattice.

Such symbols as the above described 2H, 3R, 6R, 9R, 18R, M2H, M3R, M6R, M9R, and M18R are used as the method of denoting crystal structures of a layered construction according to Ramsdell's classification. The symbols H and R mean that respective symmetries in the direction perpendicular to the lamination plane are hexagonal symmetry and rhombohedral symmetry. If there is no M appended at the beginning, it means that the crystal structure is an orthorhombic crystal. If there is M appended at the beginning, it means that the crystal structure is a monoclinic crystal. Even if same classification symbols are used, there are cases in which distinction is made by the difference in the order of the layers. For example, since $\beta_1'$ phase and $\beta_1''$ phase, which are two kinds of M phase, have a different layered construction, there are cases in which they are distinguished by being denoted as 18R$_1$ and 18R$_2$, or M18R$_1$ and M18R$_2$ etc., respectively.

In General, M transformation and reverse transformation in normal shape memory effects and pseudoelastic effects often involve volume contraction or volume expansion. When a negative electrode active material relating to the present embodiment electrochemically releases or occludes metal ions (for example, lithium ions), it is considered that the crystal structure often changes in consistent with the phenomena of volume contraction or volume expansion in the direction of respective transformation.

However, the negative electrode active material according to the present embodiment will not be particularly limited by such restriction. When M transformation or reverse transformation occurs following occlusion and release of metal ions in the specific alloy phase, there may be generated other crystal structures than the crystal structure that appears at the time of ordinary shape memory effects and pseudoelastic effects.

When the specific alloy phase is of type 3, the specific alloy phase undergoes slip deformation or twin deformation following occlusion or release of metal ions. In slip deformation, since dislocation is introduced as the lattice defect, reversible deformation is difficult. Therefore, when the specific alloy phase is of type 3, it is preferable that twin deformation dominantly occurs.

[Chemical Composition of Material C]

The chemical composition of material C containing an active substance made up of the above described specific alloy phase is not particularly limited provided that the crystal structure at the time of M transformation and reverse transformation contains the above described crystal structures.

When the specific alloy phase is of type 1, the chemical composition of the specific alloy phase contains, for example, Cu (copper) and Sn (tin).

When the specific alloy phase is of type 1, preferably, the crystal structure of the specific alloy phase after reverse transformation caused by discharge of metal ions is $DO_3$ structure, and the crystal structure of the specific alloy phase after M transformation caused by occlusion of metal ions is 2H structure.

Preferably, a specific alloy phase of the material C contains Sn, with the balance being Cu and impurities. More preferably, the specific alloy phase contains 10 to 20 at % or 21 to 27 at % of Sn, with the balance being Cu and impurities, wherein the negative electrode active material contains 2H structure after M transformation, and $DO_3$ structure after reverse transformation. A more preferable Sn content in the material C is 13 to 16 at %, 18.5 to 20 at %, or 21 to 27 at %.

The chemical composition of a specific alloy phase may contain one or more selected from the group consisting of Ti, V, Cr, Mn, Fe, Co, Ni, Zn, Al, Si, B, and C, and Sn, with the balance being Cu and impurities.

Preferably, the chemical composition of the specific alloy phase in this case contains: Sn: 10 to 35 at %, and one or more selected from the group consisting of Ti: 9.0 at % or less, V: 49.0 at % or less, Cr: 49.0 at % or less, Mn: 9.0 at % or less, Fe: 49.0 at % or less, Co: 49.0 at % or less, Ni: 9.0 at % or less, Zn: 29.0 at % or less, Al: 49.0 at % or less, Si: 49.0 at % or less, B: 5.0 at % or less, and C: 5.0 at % or less, with the balance being Cu and impurities. The above described Ti, V, Cr, Mn, Fe, Co, Ni, Zn, Al, Si, B and C are optional elements.

A preferable upper limit of Ti content is 9.0 at % as described above. The upper limit of Ti content is more preferably 6.0 at %, and further preferably 5.0 at %. A lower limit of Ti content is preferably 0.1 at %, more preferably 0.5 at %, and further preferably at 1.0 at %.

A preferable upper limit of V content is 49.0 at % as described above. The upper limit of V content is more preferably 30.0 at %, further preferably 15.0 at %, and furthermore preferably 10.0 at %. A lower limit of V content is preferably 0.1 at %, more preferably 0.5 at %, and further preferably at 1.0 at %.

A preferable upper limit of Cr content is 49.0 at % as described above. The upper limit of Cr content is more preferably 30.0 at %, further preferably 15.0 at %, and furthermore preferably 10.0 at %. A lower limit of Cr content is preferably 0.1 at %, more preferably 0.5 at %, and further preferably at 1.0 at %.

A preferable upper limit of Mn content is 9.0 at % as described above. The upper limit of Mn content is more preferably 6.0 at %, and further preferably 5.0 at %. A lower limit of Mn content is preferably 0.1 at %, more preferably 0.5 at %, and further preferably at 1.0 at %.

A preferable upper limit of Fe content is 49.0 at % as described above. The upper limit of Fe content is more preferably 30.0 at %, further preferably 15.0 at %, and furthermore preferably 10.0 at %. A lower limit of Fe content is preferably 0.1 at %, more preferably 0.5 at %, and further preferably at 1.0 at %.

A preferable upper limit of Co content is 49.0 at % as described above. The upper limit of Co content is more preferably 30.0 at %, further preferably 15.0 at %, and furthermore preferably 10.0 at %. A lower limit of Co content is preferably 0.1 at %, more preferably 0.5 at %, and further preferably at 1.0 at %.

A preferable upper limit of Ni content is 9.0 at % as described above. The upper limit of Ni content is more preferably 5.0 at %, and further preferably 2.0 at %. A lower limit of Ni content is preferably 0.1 at %, more preferably 0.5 at %, and further preferably at 1.0 at %.

A preferable upper limit of Zn content is 29.0 at % as described above. The upper limit of Zn content is more preferably 27.0 at %, and further preferably 25.0 at %. A lower limit of Zn content is preferably 0.1 at %, more preferably 0.5 at %, and further preferably at 1.0 at %.

A preferable upper limit of Al content is 49.0 at % as described above. The upper limit of Al content is more preferably 30.0 at %, further preferably 15.0 at %, and furthermore preferably 10.0 at %. A lower limit of Al content is preferably 0.1%, more preferably 0.5 at %, and further preferably at 1.0 at %.

A preferable upper limit of Si content is 49.0 at % as described above. The upper limit of Si content is more preferably 30.0 at %, further preferably 15.0 at %, and furthermore preferably 10.0 at %. A lower limit of Si content is preferably 0.1 at %, more preferably 0.5 at %, and further preferably at 1.0 at %.

A preferable upper limit of B content is 5.0 at %. The lower limit of B content is preferably 0.01 at %, more preferably 0.1 at %, further preferably 0.5 at %, and furthermore preferably 1.0 at %.

A preferable upper limit of C content is 5.0 at %. The lower limit of C content is preferably 0.01 at %, more preferably 0.1 at %, further preferably 0.5 at %, and furthermore preferably 1.0 at %.

Preferably, the material C contains one or more selected from the group consisting of δ phase of F-Cell structure containing site deficiency, ε phase of 2H structure containing site deficiency, η' phase of monoclinic crystal containing site deficiency, and a phase having $DO_3$ structure containing site deficiency. Hereinafter, these δ phase, ε phase, η' phase, and phase having $DO_3$ structure, each containing site deficiency is also referred to as "site deficient phase". Here, "site deficiency" means a state of a crystal structure in which occupancy factor is less than 1 in a specific atomic site.

These site deficient phases include a plurality of site deficiencies in the crystal structure. These site deficiencies function as a storage site or a diffusion site of metal ions (such as Li ions). Therefore, if a material C contains an alloy phase which becomes 2H structure after M transformation and becomes $DO_3$ structure after reverse transformation, and at least one phase among the above described site deficient phases, the discharge capacity and the cycle characteristics of the negative electrode active material are further improved.

The chemical composition of a material C may further contain a Group 2 element and/or rare earth metal (REM) for the purpose of increasing discharge capacity. The Group 2 elements include, for example, magnesium (Mg) calcium (Ca) and the like. REMs include, for example, lanthanum (La), cerium (Ce), praseodymium (Pr), neodymium (Nd) and the like.

The material C may be made up of the above described specific alloy phase, or may contain the above described specific alloy phase and another active material phase which is metal ion-active. Another active material phase includes, for example, a tin (Sn) phase, a silicon (Si) phase, an aluminum (Al) phase, a Co—Sn alloy phase, a $Cu_6Sn_5$ compound phase (η' phase or η phase) and the like.

[Volume Expansion Ratio and Volume Contraction Ratio of Specific Alloy Phase]

When the above described specific alloy phase undergoes M transformation Or reverse transformation following occlusion and release of metal ions, preferable volume expansion/contraction ratio of unit cell of the specific alloy phase is not more than 20%. In this case, it is possible to sufficiently relax the strain due to a volume change which occurs following occlusion and release of metal ions. The volume expansion/contraction ratio of unit cell of the specific alloy phase is more preferably not more than 10%, and further preferably not more than 5%.

The volume expansion/contraction ratio of the specific alloy phase can be measured by an in-situ X-ray diffraction during charging/discharging. To be specific, an electrode plate of negative electrode active material, a separator, a counter electrode lithium, and electrolytic solution are placed and sealed in a dedicated charge/discharge cell including a window made of beryllium which transmits X-ray, within a glove box in pure argon gas atmosphere in which moisture is controlled such that due point is not more than −80° C. Then, this charge/discharge cell is mounted onto the X-ray diffraction apparatus. After mounting, an X-ray diffraction profile of the specific alloy phase is obtained in each of an initially charged state and an initially discharged state in the course of charging and discharging. From this X-ray diffraction profile, a lattice constant of the specific alloy phase is found. From the lattice constant, it is possible to calculate the volume change ratio in consideration of crystal lattice correspondence of the specific alloy phase.

When the shape of X-ray diffraction profile changes due to full width at half maximum etc. in the charge-discharge cycling process, analysis is performed after repeating charging and discharging 5 to 20 times as needed. Then, an average value of volume change ratio is found from a plurality of X-ray diffraction profiles having high reliability.

[Analysis Method of Crystal Structure of Alloy Phase Contained by Negative Electrode Active Material]

(1) The crystal structure of the phase (including an alloy phase) contained in the negative electrode active material can be analyzed by Rietveld method based on the X-ray diffraction profile obtained by using an X-ray diffraction apparatus. To be specific, the crystal structure is analyzed by the following method.

For a negative electrode active material before use for a negative electrode, X-ray diffraction measurement is performed on the material C to obtain measured data of X-ray diffraction profile. Based on the obtained X-ray diffraction profile (measured data), the configuration of phases in the material C is analyzed by Rietveld method. For the analysis by Rietveld method, either of "RIETAN2000" (program name) or "RIETAN-FP" (program name) which are general-purpose analysis software is used.

(2) The crystal structure of a negative electrode active material in a negative electrode before charging in a battery is determined by the same method as that in (1). To be specific, the battery, which is in an uncharged state, is disassembled within the glove box in argon atmosphere, and the negative electrode is taken out from the battery. The negative electrode taken out is enclosed with Myler foil. Thereafter, the perimeter of the Myler foil is sealed by a thermocompression bonding machine. Then, the negative electrode sealed by the Myler foil is taken out of the glove box.

Next, a measurement sample is fabricated by bonding the negative electrode to a reflection-free sample plate (a plate of a silicon single crystal which is cut out such that a specific crystal plane is in parallel with the measurement plane) with hair spray. The measurement sample is mounted onto the X-ray diffraction apparatus and X-ray diffraction measurement of the measurement sample is performed to obtain an X-ray diffraction profile. Based on the obtained X-ray diffraction profile, the crystal structure of the negative electrode active material in the negative electrode is determined by the Rietveld method.

(3) Crystal structures of the negative electrode active material in the negative electrode after charging one to multiple times and after discharging one to multiple times are determined by the same method as that in (2).

To be specific, the battery is fully charged in a charging/discharging test apparatus. The fully charged battery is disassembled in the glove box, and a measurement sample is fabricated by a method similar to that of (2). The measurement sample is mounted onto the X-ray diffraction apparatus and X-ray diffraction measurement is performed.

Moreover, the battery is fully discharged, and the fully discharged battery is disassembled in the glove box and a measurement sample is fabricated by a method similar to that of (2) to be subjected to X-ray diffraction measurement.

<Production Method of Material C>

A production method of material C, which contains the above-described specific alloy phase, will be described.

Molten metal of the raw material of material C containing the specific alloy phase is produced. For example, molten metal having the above described chemical composition is produced. The molten metal is produced by melting starting material by an ordinary melting method such as arc melting or resistance heating melting. Next, an ingot (bulk alloy) is produced by an ingot casting method by using the molten metal.

Alternatively, a thin cast piece or particle is produced, preferably by subjecting the molten metal to rapid solidification. This method is called a rapid solidification method. Examples of the rapid solidification method include a strip casting method, a melt-spinning method, a gas atomization method, a melt spinning method, a water atomization method, an oil atomization method, and the like.

The bulk alloy (ingot) obtained by melting is (1) cut, (2) coarsely crushed by a hammer mill etc., or (3) finely pulverized mechanically by a ball mill, an attritor, a disc mill, a jet mill, a pin mill, and the like to adjusted into a necessary particle size. When the bulk alloy has ductility and ordinary pulverization is difficult, the bulk alloy may be subjected to cutting and pulverization by a grinder disc, which is embedded with diamond abrasive particles, and the like. When M phase due to stress induction is formed in these pulverization processes, the formation ratio thereof is adjusted as needed by appropriately combining the alloy design, heat treatment, and pulverization conditions thereof. When powder generated by an atomization method can be used as melted or as heat treated, there may be cases where no pulverization process is particularly needed. Moreover, when melted material is obtained by a strip casting method and crushing thereof is difficult due to its ductility, the melted material is adjusted to have a predetermined size by being subjected to mechanical cutting such as shearing. Moreover, in such a case, the melted material may be heat treated in a necessary stage, to adjust the ratio between M phase and a matrix phase, and the like.

When adjusting the constitution ratio, etc. of the specific alloy phase by heat treatment, the material may be rapidly cooled after being retained at a predetermined temperature for a predetermined time period in inert atmosphere as needed. In this occasion, the cooling rate may be adjusted by selecting a quenching medium such as water, salt water with ice, oil, and liquid nitrogen according to the size of the material, and setting the quenching medium to a predetermined temperature. Moreover, immediately after quenching into the medium such as water, liquid nitrogen sub-zero treatment may be performed to adjust the constitution ratio of the specific alloy phase and the martensite transformation temperature.

(II) Material A and Material B

The peak at 1360 cm$^{-1}$ of the Raman spectrum is a peak of low crystalline carbonaceous material, and the peak at 1580 cm$^{-1}$ is a peak of graphite-base carbonaceous material. Therefore, it is meant that as the peak intensity ratio of carbonaceous material represented by 1360 cm$^{-1}$/1580 cm$^{-1}$ (hereinafter, referred to as "peak intensity ratio") increases, the graphitization degree of that material decreases (becomes low crystalline). On the contrary, it is meant that the smaller the peak intensity ratio is, the higher the graphitization degree is.

Material A whose peak intensity ratio is as small as not more than 0.5 is carbonaceous material with a high graphitization degree (that is, graphite-based carbonaceous material). On the other hand, material B whose peak intensity ratio is as large as more than 0.5 is a low crystalline carbonaceous material.

Material C is a material having a high discharge capacity. The negative electrode active material of the present invention contains, in addition to this material C, at least material A, and more preferably contains material B. As a result of this, the capacity retention ratio of the negative electrode active material increases, and thus the cycle characteristics improves. This mixing also has further effect of decreasing irreversible capacity.

Material A, which is a graphite-base carbonaceous material, increases the capacity of the negative electrode active material as well as improves the capacity retention ratio by being mixed with material C.

Specifically, if material A which is a graphite-base carbonaceous material is mixed with material C, material A which is a graphite-base carbonaceous material is easily deformed when subjected to pressing after being applied on the negative electrode plate as a negative electrode mixture, thus improving the contact property with the surface of the hard material C. For that reason, the electron conductivity of the negative electrode active material improves. Therefore, the discharge capacity increases. Further, in the course of repeating charge-discharge cycles, insulating film resulting from the electrolytic solution is not likely to be formed in the area of the contact surface. As a result of that, the capacity retention ratio increases. As so far described, material A increases the discharge capacity of the negative electrode active material which is mixed powder, and further improves the capacity retention ratio. To sufficiently achieve these effects, the peak intensity ratio of material A is not more than 0.5. The peak intensity ratio of material A is preferably not more than 0.4.

Material A is powder of graphite-based carbonaceous material, and the production method thereof is not particularly limited provided that it is powder of carbonaceous material that exhibits a necessary peak intensity ratio of the Raman spectrum. In a production method of material A, for example, spheroidal natural graphite is mixed with pitch powder, and is calcined in a nitrogen gas flow. In measuring Raman values, the pitch coat layer of the surface of graphite particle is removed in advance by argon sputtering to detect the property of the bulk. Selection of natural graphite makes it possible to formulate carbonaceous materials having different graphitization degrees and average particle sizes.

The specific surface area of the powder of material A is preferably not more than 1.5 m$^2$/g. A specific surface area of not more than 1.5 m$^2$/g makes it possible to suppress the amount of surface film which is adhered to the surface of the negative electrode at the first cycle, thereby suppressing increase in the irreversible capacity due to the formation of the surface film. To adjust the specific surface area to be not more than 1.5 m$^2$/g, pulverization may be performed before graphitization. Performing graphitization after pulverization will result in powder having a smaller specific surface area since cracks and surface defects generated by pulverization are blocked during the heat treatment for graphitization.

Material B is powder of low crystalline carbonaceous material. Material B improves electron conductivity in the active material (active substance mixture) by being mixed with material A and material C, and thereby increases the capacity retention ratio. Specifically, in the course of repeating charge-discharge cycles, fine particles of material B having a good conductivity are present in the contact surface area between active substance particles of material C. As a result of this, electron conductivity is maintained, and capacity retention ratio is increased. To sufficiently achieve these effects, the peak intensity ratio of material B is made to be more than 0.5. The peak intensity ratio of material B is preferably not less than 0.6.

The powder of carbonaceous material, which is suitable for use as the material B, is carbon black, and among others, carbon black with a high conductivity, such as acetylene black and Ketjen black is preferable.

Material A and material B are porous. For that reason, electrolyte solution infiltrates into cavities within these particles. As a result of this, material A and material B also have a function of supporting the conduction of metal ions. Therefore, material A and material B can sufficiently draw and utilize electric capacity potential as a negative electrode of material C which is alloy active substance, thereby increasing discharge capacity.

Further, the surface of the active substance particle of material C forms an interface with material A and material B. In this occasion, the proportion of the interface which is in direct contact with electrolytic solution is reduced, and a degradable film resulted from the electrolyte is not likely to be formed. As a result of this, irreversible capacity decreases.

The grain sizes of material A and material B are both not particularly limited. However, it is preferable particularly for material A to have a smaller specific surface area. Specifically, an average grain size D50 of material A is preferably not less than 5 μm, and more preferably not less than 10 μm. On the other hand, while material B is generally very fine powder particularly when it is carbon black, such will not be a problem. As described later, to cause material A and material B to be present around material C, it is more favorable that material A and material B are fine powder, since they can be present more uniformly around material C.

(III) Mixing Ratio of Materials A, B, and C

The negative electrode active material (mixed material) relating to the present invention contains material C, and one or more selected from the group consisting of material A and material B. Preferable mixing ratio of each material is as follows.

When the negative electrode active substance contains material B, a mass ratio of material B/(material A+material B+material C) is preferably 0.01 to 0.2. It is defined as F1=material B/(material A+material B+material C). The terms "material A", "material B", and "material C" in F1 are substituted by masses of the corresponding materials, respectively.

If F1 is not less than 0.01, it is possible to more sufficiently absorb the expansion of material C, thereby obtaining better cycle characteristics. If F1 is not more than 0.2, it is possible to suppress the increase of irreversible capacity. The lower limit of F1 is more preferably 0.05. The upper limit of F1 is more preferably 0.08.

When the negative electrode active material contains material A and material C, the mass ratio of material A/material C is preferably 0.01 to 7. It is defined as F2=material A/material C. The terms "material A" and "material C" in F2 are substituted by masses of the corresponding materials, respectively.

If F2 is not less than 0.01, it is possible to suppress the increase of irreversible capacity. Further, since the proportion of material C is more appropriate, it is also possible to suppress the deterioration of cycle characteristics. If F2 is not more than 7, it is possible to ensure a larger negative electrode capacity. The lower limit of F2 is more preferably 0.15. The upper limit of F2 is more preferably 0.25.

<Production Method of Negative Electrode Active Material>

A negative electrode active material is produced by mixing the above described material A (and further preferably material B) with the powder of material C obtained by the above described production method. The mixing method is not particularly limited.

<Production Method of Negative Electrode>

A negative electrode which uses the negative electrode active material relating to an embodiment of the present invention can be produced by a method well known to the person skilled in the art.

For example, a binder such as polyvinyl idene fluoride (PVDF), polymethyl methacrylate (PMMA), polytetrafluoroethylene (PTFE), and styrene-butadiene rubber (SBR) is admixed to powder of a negative electrode active material of an embodiment of the present invention, and further carbon material powder such as natural graphite, artificial graphite, and acetylene black is admixed thereto to impart sufficient conductivity to the negative electrode. After being dissolved by adding a solvent such as N-methylpyrrolidone (NMP), dimethylformamide (DMF) and water, the binder is stirred well using a homogenizer and glass beads if necessary, and formed into a slurry. This slurry is applied on an active substance support member such as a rolled copper foil and an electrodeposited copper foil and is dried. Thereafter, the dried product is subjected to pressing. Through the above described processes, a negative electrode plate is produced.

The amount of the binder to be admixed is preferably about 5 to 10 mass % from the viewpoint of the mechanical strength and battery characteristics of the negative electrode. The support member is not limited to a copper foil. The support member may be, for example, a foil of other metals such as stainless steel and nickel, a net-like sheet punching plate, a mesh braided with a metal element wire and the like.

The particle size of the powder of negative electrode active material affects the thickness and density of electrode, that is, the capacity of electrode. The thickness of electrode is preferably as thin as possible. This is because a smaller thickness of electrode can increase the total surface area of the negative electrode active material included in a battery. Therefore, an average particle size of the powder of negative electrode active material is preferably not more than 100 µm. As the average particle size of the powder of negative electrode active material decreases, the reaction area of the powder increases, thereby resulting in excellent rate characteristics. However, when the average particle size of the powder of negative electrode active material is too small, the properties and condition of the surface of the powder change due to oxidation etc. so that it becomes difficult for lithium ions to enter into the powder. In such a case, the rate characteristics and the efficiency of charging/discharging may decline over time. Therefore, the average particle size of the powder of negative electrode active material is preferably 0.1 to 100 µm, and more preferably 1 to 50 µm.

<Production Method of Battery>

A nonaqueous electrolyte secondary battery according to the present embodiment includes a negative electrode, a positive electrode, a separator, and an electrolytic solution or electrolyte as described above. The shape of the battery may be a cylindrical type, a square shape as well as a coin type and a sheet type. The battery of the present embodiment may be a battery utilizing a solid electrolyte such as a polymer battery and the like.

The positive electrode of the battery of the present embodiment preferably contains a transition metal compound containing a metal ion as the active material. More preferably, the positive electrode contains a lithium (Li)-containing transition metal compound as the active material. An example of the Li-containing transition metal compound is $LiM_1-xM'xO_2$, or $LiM_{2y}M'O_4$. Where, in the chemical formulae, $0 \leq x$, $y \leq 1$, and M and M' are respectively at least one kind of barium (Ba), cobalt (Co), nickel (Ni), manganese (Mn), chromium (Cr), titanium (Ti), vanadium (V), iron (Fe), zinc (Zn), aluminum (Al), indium (In), tin (Sn), scandium (Sc) and yttrium (Y).

However, the battery of the present embodiment may use other positive electrode materials such as transition metal chalcogenides; vanadium oxide and lithium (Li) compound thereof; niobium oxide and lithium compound thereof; conjugated polymers using organic conductive substance; Shepureru phase compound; activated carbon; activated carbon fiber; and the like.

The electrolytic solution of the battery of the present embodiment is generally a nonaqueous electrolytic solution in which lithium salt as the supporting electrolyte is dissolved into an organic solvent. Examples of lithium salt include $LiClO_4$, $LiBF_4$, $LiPF_6$, $LiAsF_6$, $LiB(C_6H_5)$, $LiCF_3SO_3$, $LiCH_3SO_3$, $Li(CF_3SO_2)_2N$, $LiC_4F_9SO_3$, $Li(CF_2SO_2)_2$, LiCl, LiBr, and LiI. These may be used singly or in combination. The organic solvent is preferably carbonic ester, such as propylene carbonate, ethylene carbonate, ethyl methyl carbonate, dimethyl carbonate, and diethyl carbonate. However, other various kinds of organic solvents including carboxylate ester and ether are usable. These organic solvents may be used singly or in combination.

The separator is placed between the positive electrode and the negative electrode. The separator serves as an insulator. Further, the separator greatly contributes to the retention of electrolyte. The battery of the present embodiment may include a well known separator. The separator is made of, for example, polypropylene or polyethylene, which is polyolefin-based material, or mixed fabric of the two, or a porous body such as a glass filter. The above described negative electrode, positive electrode, separator, and electrolytic solution into which electrolyte is dissolved are accommodated in a container to produce a battery.

Hereinafter, the negative electrode active material, the negative electrode, and the battery of the present embodiment described above will be described in more detail by using Examples. It is noted that the negative electrode active material, the negative electrode, and the battery of the present embodiment will not be limited to Examples shown below.

EXAMPLES

Powdered negative electrode active materials, negative electrodes, and coin batteries of Inventive Examples 1 to 10 of the present invention and Comparative Examples 1 to 5 shown in Table 1 were produced by the following method. Then, changes in the crystal structure of each negative electrode active material caused by charging/discharging were confirmed. Further, discharge capacity (discharge capacity per mass) and cycle characteristics of each battery were investigated.

1. In measuring Raman values, the pitch coat layer of the surface of graphite particle was removed in advance by argon sputtering to detect the property of the bulk.

[Material B]

Commercially available acetylene black was used as material B. The average particle size (D50) of this material B was 35 nm. F1 values are listed in the "B/(A+B+C)" column of the "Mixing ratio" column, and F2 values are listed in the "A/C" column in Table 1.

[Production of Negative Electrode]

A mixture (negative electrode active material) in which the above described material A, material B, and material C were mixed in the proportion listed in Table 1, styrene-butadiene rubber (SBR) as a binder (2-fold dilution), and carboxymethylcellulose (CMC) as a thickening agent were

TABLE 1

| | Peak intensity ratio | | | Mixing ratio | | Battery characteristics | | | |
|---|---|---|---|---|---|---|---|---|---|
| | | | | | | Initial discharge | Discharge capacity at | Capacity retention | Initial Coulomb |
| | Material A | Material B | Alloy phase chemical composition of material C | B/(A + B + C) | A/C | capacity (mAh/g) | 20th cycle (mAh/g) | ratio (%) | efficiency (%) |
| Inventive Example 1 | 0.23 | 0.77 | (1) Cu—23 at % Sn—5 at % Si | 0.1 | 0.059 | 260.1 | 256.3 | 98.5 | 88.6 |
| Inventive Example 2 | 0.23 | 0.77 | (1) Cu—23 at % Sn—5 at % Si | 0.015 | 0.094 | 291.5 | 295.0 | 101.2 | 91.8 |
| Inventive Example 3 | 0.23 | 0.77 | (1) Cu—23 at % Sn—5 at % Si | 0.18 | 0.025 | 148.4 | 155.0 | 104.4 | 73.3 |
| Inventive Example 4 | 0.23 | — | (1) Cu—23 at % Sn—5 at % Si | 0 | 0.176 | 97.2 | 113.4 | 116.7 | 61.6 |
| Inventive Example 5 | 0.23 | — | (1) Cu—23 at % Sn—5 at % Si | 0 | 0.015 | 181.0 | 165.3 | 91.3 | 71.5 |
| Inventive Example 6 | 0.23 | — | (1) Cu—23 at % Sn—5 at % Si | 0 | 6.5 | 180.2 | 178.6 | 99.1 | 60.5 |
| Comparative Example 1 | 0.23 | — | (1) Cu—23 at % Sn—5 at % Si | 0 | 7.8 | 63.8 | 60.2 | 94.4 | 55.4 |
| Comparative Example 2 | — | — | (1) Cu—23 at % Sn—5 at % Si | 0 | 0 | 3.2 | 0.5 | 14.4 | 25.6 |
| Inventive Example 7 | 0.23 | 0.77 | (2) Cu—20 at % Sn—10 at % Al | 0.1 | 0.059 | 230.6 | 226.1 | 98.0 | 65.9 |
| Comparative Example 3 | — | — | (2) Cu—20 at % Sn—10 at % Al | 0 | 0 | 13.8 | 0.4 | 2.9 | 21.3 |
| Inventive Example 8 | 0.23 | 0.77 | (3) Cu—25 at % Sn | 0.1 | 0.059 | 260.3 | 240.8 | 92.5 | 63.8 |
| Comparative Example 4 | — | — | (3) Cu—25 at % Sn | 0 | 0 | 1.3 | 0.4 | 27.7 | 23.2 |
| Comparative Example 5 | 0.23 | 0.77 | (1) Cu—23 at % Sn—5 at % Si | 0.014 | 0.004 | 72.3 | 63.2 | 87.4 | 60.1 |
| Inventive Example 9 | 0.23 | 0.77 | (1) Cu—23 at % Sn—5 at % Si | 0.29 | 0.097 | 150.3 | 164.6 | 109.5 | 51.3 |
| Inventive Example 10 | 0.23 | 0.77 | (1) Cu—23 at % Sn—5 at % Si | 0.004 | 0.097 | 201.7 | 170.3 | 84.4 | 67.4 |

Inventive Example 1 of the Present Invention

[Production of Material C]

A mixture of a plurality of starting materials (single-element reagents) is high-frequency melted in a nozzle made of boron nitride in argon gas atmosphere to produce a molten metal such that the final chemical composition of the negative electrode active material becomes the chemical composition listed in the "Alloy phase chemical composition of material C" column in Table 1.

A rapidly solidified foil band was produced by spraying the molten metal onto a rotating copper roll. The thickness of the foil band was 20 to 40 μm. This foil band was pulverized by a grinding machine (automatic mortar) into alloy powder of a size of not more than 45 μm. This alloy powder was supposed to be material C. The chemical composition of this material C was as listed in the "Alloy phase chemical composition of material C" column in Table 1. For example, "Cu-23 at % Sn-5 at % Si" of Inventive Example 1 in Table 1 indicates that the chemical composition of material C of Inventive Example 1 contains 23 at % of Sn and 5 at % of Si, with the balance being Cu and impurities.

[Production of Material A]

Material A was produced by mixing 2 mass % of pitch powder into spheroidal natural graphite, and calcining the mixture at 1000° C. in a nitrogen gas flow. The average particle size (D50) of obtained material A was 20 μm. The peak intensity ratio of this material A was as listed in Table mixed in a mass ratio of 85:10:5 (blending quantity was 1 g:0.134 g:0.067 g). Then, a kneading machine was used to produce a negative electrode mixture slung by adding distilled water to the mixture such that slurry density was 27.2%. Since the styrene-butadiene rubber was used by being diluted 2-fold with water, 0.134 g of styrene-butadiene rubber was blended when weighing.

The produced negative electrode mixture slurry was applied on a metal foil by using an applicator (150 μm). The metal foil applied with the slurry was dried at 100° C. for 20 minutes. The metal foil after drying had a coating film made up of the negative electrode active material on the surface. The metal foil having the coating film was subjected to punching to produce a disc-shaped metal foil having a diameter of 13 mm. The metal foil after punching was pressed at a press pressure of 500 kgf/cm² to produce a plate-shaped negative electrode. In negative electrodes to be used for the evaluation and measurement of the negative electrode active material other than the determination of crystal structure, the metal foil was copper foil. In a negative electrode to be used for the determination of crystal structure, the metal foil was nickel foil.

[Production of Battery]

The produced negative electrode, EC-DMC-EMC-VC-FEC as the electrolytic solution, a polyolefin separator (ϕ17 mm) as the separator, and a metal Li plate (ϕ19×1 mmt) as the positive electrode material were prepared. Thus prepared negative electrode, the electrolytic solution, the separator, and the positive electrode were used to produce a coin battery of 2016 type. Assembly of the coin battery was performed within a glove box in argon atmosphere.

[Determination of Crystal Structure]

The crystal structures of material C to be used in the negative electrode, material C in the negative electrode before initial charging, and material C in the negative electrode after 1 to 5 times of charging and discharging were determined by the following method. X-ray diffraction measurements were carried out for the target negative electrode active materials to obtain measured data. Then, based on the obtained measured data, crystal structures included in the target negative electrode active materials were determined by the Rietveld method. More specifically, the crystal structures were determined by the following method.

(1) Crystal Structure Analysis of Material C Before Use in Negative Electrode

X-ray diffraction measurements were carried out for the material C before use in the negative electrode to obtain measured data of X-ray diffraction profile.

To be specific, SmartLab (product of Rigaku Co., Ltd) (rotor target maximum output 9 KW; 45 kV-200 mA) was used to obtain X-ray diffraction profiles of the powder of the material C.

Based on the obtained X-ray diffraction profiles (measured data), crystal structures of alloy phases in the material C were analyzed by Rietveld method.

The $DO_3$ ordered structure is an ordered structure as shown in FIG. 1. In a Cu—Sn base alloy, mainly Cu is present at atomic sites shown by a black circle and mainly Sn is present at atomic sites shown by a white circle, in FIG. 1. Respective sites may be replaced by addition of a third element. It is known that such a crystal structure falls into No. 225 (Fm-3m) of International Table (Volume-A) in the classification of space group representation. The lattice constant and atomic coordinates of this space group number are as shown in Table 2.

TABLE 2

| Parent phase ($\beta_1$ Phase), Crystal Structure: $DO_3$ Space Group Number (International Table A): No. 225 (Fm-3m) Lattice Constant: a = 6.05 Å | | | | | |
|---|---|---|---|---|---|
| Site Name | Atomic Species | Multiplicity/ Wyckoff Symbol | Atomic Coordinates | | |
| | | | x | y | z |
| Sn1 | Sn | 4a | 0.0 | 0.0 | 0.0 |
| Cu1 | Cu | 8c | ¼ | ¼ | ¼ |
| Cu2 | Cu | 4b | ½ | ½ | ½ |

Accordingly, with the structure model of this space group number being as the initial structure model of Rietveld analysis, a calculated value of diffraction profile (hereinafter, referred to as a calculated profile) of $\beta_1$ phase ($DO_3$ structure) of this chemical composition was found by Rietveld method. RIETAN-FP (program name) was used for Rietveld analysis.

Further, a calculated profile of the crystal structure of phase was found as well. The crystal structure of $\gamma_1'$ was 2H structure in the notation of Ramsdell symbol, and the space group was No. 59-2 (Pmmn) of International Table (Volume-A). The lattice constant and atomic coordinates of No. 59-2 (Pmmn) are shown in Table 3.

TABLE 3

| M Phase ($\gamma_1'$ Phase), Crystal Structure: 2H Space Group Number (International Table A): No. 59-2 (Pmmn) Lattice Constants: a = 4.379 Å, b = 5.498 Å, c = 4.615 Å | | | | | |
|---|---|---|---|---|---|
| Site Name | Atomic Species | Multiplicity/ Wyckoff Symbol | Atomic Coordinates | | |
| | | | x | y | z |
| Sn1 | Sn | 2b | ¼ | ¾ | ⅙ |
| Cu1 | Cu | 2a | ¼ | ¼ | ⅙ |
| Cu2 | Cu | 4e | ¼ | 0.0 | ⅔ |

Figure 3:
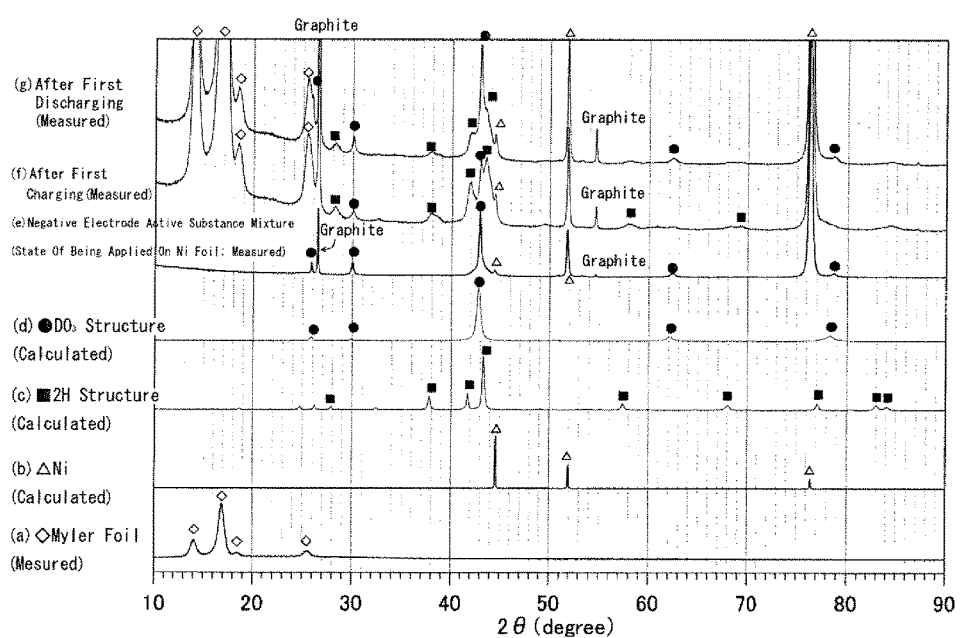
FIG. 3 is a diagram illustrating an X-ray diffraction profiles before and after charging-discharging of the alloy phase of Inventive Example 1 of the present invention, and simulation results by Rietveld method.

A calculated profile was found by using RIETAN-FP supposing that the crystal structure of the space group number of the above describe Table 3 be the initial structure model of Rietveld analysis. In FIG. 3, (d) shows a calculated profile of $DO_3$ structure, and (c) shows a calculated profile of 2H structure.

A result of the analysis revealed that a $\beta_1$ phase ($DO_3$ structure) which is the matrix phase of a $\gamma_1'$ phase (2H structure) which is a kind of M phase, is present singly in the material C of Inventive Example 1.

(2) Crystal Structure Analysis of Negative Electrode Active Material in Negative Electrode The crystal structure of a negative electrode active material in a negative electrode before charging was also determined by the same method as that in (1). Measured X-ray diffraction profiles were measured by the following method.

The above described coin battery, which was before being charged, was disassembled within the glove box in argon atmosphere, and a plate-shaped negative electrode (including nickel foil) was taken out from the coin battery. The negative electrode taken out was enclosed in Myler foil (manufactured by DuPont). Thereafter, the perimeter of the Myler foil was sealed by a thermocompression bonding machine. Then, the negative electrode sealed by the Myler foil was taken out of the glove box.

Next, a measurement sample was fabricated by bonding the negative electrode to a reflection-free sample plate manufactured by Rigaku Co., Ltd. (a plate of a silicon single crystal which was cut out such that a specific crystal plane was in parallel with the measurement plane) with a hair spray.

The measurement sample was mounted onto the X-ray diffraction apparatus described below in (4), and the X-ray diffraction measurement of the measurement sample was performed under measurement conditions described below in (4).

(3) Analysis of Crystal Structure of Negative Electrode Active Material in Negative Electrode after Charging and after Discharging The crystal structure of the material C in the negative electrode active material in the negative electrode after one to 5 times of charging and after one to 5 times of discharging was also determined by the same method as that in (1). Measured X-ray diffraction profiles were measured by the following method.

The above described coin battery was fully charged in a charging/discharging test apparatus. The fully charged coin battery was disassembled in the glove box, and a measurement sample was fabricated by the same method as that in (2). The measurement sample was mounted onto the X-ray diffraction apparatus described below in (4), and X-ray diffraction measurement of the measurement sample was performed under measurement conditions described below in (4).

Moreover, the above described coin battery was fully discharged. The fully discharged coin battery was disassembled in the glove box, and a measurement sample was fabricated by the same method as in (3). The measurement sample was mounted onto the X-ray diffraction apparatus described below in (4), and X-ray diffraction measurement of the measurement sample was performed at measurement conditions described below in (4).

For a negative electrode which had been subjected to charging and discharging repeatedly in a coin battery, X-ray diffraction measurement was performed by the same method.

(4) X-Ray Diffraction Apparatus and Measurement Conditions

Apparatus: SmartLab manufactured by Rigaku Co., Ltd.
X-ray tube: Cu-Kα ray
X-ray output: 45 kV, 200 mA
Incident monochrometer: Johannson-type crystal (which filters out Cu-Kα$_2$ ray and Cu-Kβ ray)
Optical system: Bragg-Brentano geometry
Incident parallel slit: 5.0 degrees
Incident slit: ½ degree
Length limiting slit: 10.0 mm
Receiving slit 1: 8.0 mm
Receiving slit 2: 13.0 mm
Receiving parallel slit: 5.0 degrees
Goniometer: SmartLab goniometer
X-ray source—mirror distance: 90.0 mm
X-ray source—selection slit distance: 114.0 mm
X-ray source—sample distance: 300.0 mm
Sample—receiving slit 1 distance: 187.0 mm
Sample—receiving slit 2 distance: 300.0 mm
Receiving slit 1–receiving slit 2 distance: 113.0 mm
Sample—detector distance: 331.0 mm
Detector: D/Tex Ultra
Scan range: 10 to 120 degrees or 10 to 90 degrees
Scan step: 0.02 degrees
Scan mode: Continuous scan
Scanning speed: 2 degrees/min or 2.5 degrees/min (5) Analysis Results of X-Ray Diffraction Measurement Data The X-ray diffraction data obtained in (2) and (3) are shown in FIG. 3. The item (e) in FIG. 3 shows an X-ray diffraction profile of negative electrode plate obtained in (2). In the figure, (f) is an X-ray diffraction profile of the negative electrode active material after first charging; and (g) is an X-ray diffraction profile after first discharging. Reference symbol (a) in FIG. 3 indicates a measured X-ray diffraction profile in which similar X-ray diffraction is performed on a Myler film alone. Reference symbol (b) in FIG. 3 indicates an X-ray diffraction profile of Ni, which is calculated to identify diffraction lines of Ni foil used for the current collector. Reference symbol (c) in FIG. 3 indicates a calculated profile of 2H structure in the chemical composition of the present example, and reference symbol (d) in FIG. 3 indicates a calculated profile of $DO_3$ structure in the chemical composition of the present example.

(5-1)
From the X-ray diffraction data obtained in (2) and (3), it can be confirmed that no significant reaction has occurred between the negative electrode active material and the electrolytic solution.

(5-2)
From X-ray diffraction profiles of the negative electrode active material after charging (FIG. 3(f)) and the negative electrode active material after discharging (FIG. 3(g)), the diffraction line repeatedly changed in a reversible manner at a position where the diffraction angle 2θ is near 43.5° (position caused by M phase ($\gamma_1'$ phase))(hereinafter, referred to as a strongest diffraction line of M phase). That is, a structural change was suggested.

(5-3)
Accordingly, the crystal structures of the "negative electrode active material after charging" and the "negative electrode active materials after discharging" were determined by using Rietveld method.

Figure 2B:
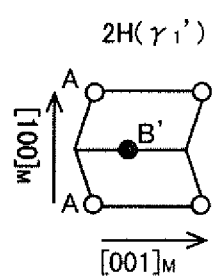
FIG. 2B is a schematic diagram of 2H structure of γ1' phase which is a kind of martensite phase.
Figure 2C:
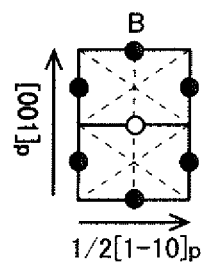
FIG. 2C is a schematic diagram of a crystal plane to explain thermoelastic diffusionless transformation from $DO_3$ structure to 2H structure.
Figure 2D:
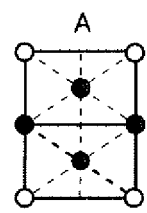
FIG. 2D is a schematic diagram of another crystal plane different from that of FIG. 2C.
Figure 2E:
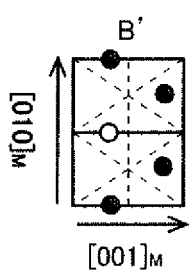
FIG. 2E is a schematic diagram of another crystal plane different from those of FIGS. 2C and 2D.

For example, in the negative electrode active material, the crystal plane A shown in FIG. 2D and the crystal plane B shown in FIG. 2C are alternately layered in the $DO_3$ structure of the matrix phase shown in FIGS. 1 and 2A. When a phase transformation occurs between the $DO_3$ structure and $\gamma_1'$ phase which is a kind of M phase, as shown in FIGS. 2A and 2B, the crystal plane B regularly undergoes shuffling due to shear stress, thereby being displaced to the position of crystal plane B'. In this case, phase transformation (M transformation) occurs without diffusion of the host lattice. In the 2H structure after M transformation, the crystal plane A shown in FIG. 2D and the crystal plane B' shown in FIG. 2E are alternately layered.

Then, it was judged whether the crystal structure of the negative electrode active material in the negative electrode of the present example involved M transformation or was not accompanied thereby (that is, involved diffusion of host lattice at the time of charging/discharging) by comparing the measured data of the X-ray diffraction profiles of the negative electrode active material after charging and after discharging, the calculated profile of pi phase ($DO_3$ structure) (FIG. 3(d): 2θ angle positions of representative diffraction lines are denoted by ● (black circle) symbols), and the calculated profile of $\gamma_1'$ phase (2H structure) (FIG. 3(c): 2θ angle positions of representative diffraction lines are denoted by ■ (black square) symbols).

Referring to FIG. 3(f), in the X-ray diffraction profile, the intensity of the strongest diffraction line of M phase of near 43.5° increased as a result of initial charging, and decreased as a result of consecutive discharging. It can be judged that this diffraction line resulted from the formation of M phase ($\gamma_1'$) by M transformation, as will be next described, from calculated profiles of RIETAN-FP).

To be specific, as shown in (f), in the 2H structure, there were increases in some of the peak intensities of 2θ angle positions (■ (black square) symbol) corresponding to the 2H structure of FIG. 3(c) including the strongest diffraction line of M phase at 43.5° in the X-ray diffraction profile after the first charging. On the other hand, there were decreases in some of the peak intensities of ● (black circle) symbol corresponding to $DO_3$ structure. In particular, intensity peaks near 43.5° did not appear in the X-ray profile (simulation result) of any crystal structure other than 2H. For X-ray diffraction lines, which appear during measurement, of a constituting member other than active substance, a measured diffraction profile of a Myler foil and a calculated profile of nickel of the current collector are shown by (a) and (b) in FIG. 3 respectively, in which 2θ angle positions of major diffraction lines are indicated by ◊ (white rhombus) symbols and Δ (white triangle) symbols, respectively. Since diffraction lines resulted from these members appear in the measured profiles of (f) and (g) in FIG. 3, corresponding positions are indicated by ◊ (white rhombus) symbols and Δ (white triangle) symbols. Note that since the negative electrode active materials of Inventive Examples are each a composite material with graphite, diffraction lines resulted from graphite appeared, and as such is indicated in (e), (f), and (g) in FIG. 3.

From the above, the negative electrode of the present Example contained an alloy phase which underwent M transformation to become M phase (2H structure) as a result of charging, and became a matrix phase ($DO_3$ structure) as a result of discharging. That is, the negative electrode of the present Example contained an alloy phase which underwent M transformation when occluding lithium ions which are metal ions, and underwent reverse transformation when releasing lithium ions. In the negative electrode of the present Example, M transformation at the time of charging, and reverse transformation at the time of discharging were repeated.

The full width at half maximum of a diffraction line decreased along with charge-discharge cycles. From this, it is considered that occlusion and release of lithium ions relaxed strain of the negative electrode active material.

[Charge-Discharge Performance Evaluation of Coin Battery]

Next, the discharge capacity, cycle characteristics, and irreversible capacity of the battery of Inventive Example 1 were evaluated.

Constant current doping (corresponding to the insertion of lithium ions into electrode, and the charging of lithium ion secondary battery) was performed to a coin battery at a current value of 0.1 mA (a current value of 0.075 $mA/cm^2$) or a current value of 1.0 mA (a current value of 0.75 $mA/cm^2$) until the potential difference against the counter electrode becomes 0.005 V. Thereafter, doping capacity was measured by continuing doping against the counter electrode at a constant voltage until the current value became 7.5 $\mu A/cm^2$ while retaining 0.005 V.

Next, de-doping capacity was measured by performing de-doping (which corresponds to desorption of lithium ions from the electrode, and discharge of the lithium ion secondary battery) at a current value of 0.1 mA (a current value of 0.075 $mA/cm^2$) or a current value of 1.0 mA (a current value of 0.75 $mA/cm^2$) until the potential difference becomes 1.2 V.

The doping capacity and de-doping capacity correspond to charge capacity and discharge capacity when the electrode is used as the negative electrode of the lithium ion secondary battery. Therefore, the measured dope capacity was defined as the charge capacity, and a measured de-doping capacity was defined as the discharge capacity.

The ratio "(charge capacity at 1st cycle–discharge capacity at 1st cycle)/discharge capacity at 1st cycle" was calculated as an initial Coulomb efficiency (%).

Charging and discharging were repeated 20 times at the same conditions as described above. Then, a capacity retention ratio (%) was defined as "the discharge capacity at the time of de-doping of the 20th cycle" divided by "the discharge capacity at the time of de-doping of the 1st cycle, and multiplied by 100.

In the coin battery of Inventive Example 1, the initial discharge capacity, discharge capacity at 20th cycle, capacity retention ratio, and initial Coulomb efficiency were as listed in Table 1.

Inventive Examples 2 to 6, 9 and 10, Comparative Examples 1, 2, and 5

In Inventive Examples 2 to 6, 9 and 10 and Comparative Examples 1 and 5, negative electrode active materials, negative electrodes, and coin batteries were produced in the same way as in Inventive Example 1 excepting that the mixing ratios of material A, material B, and material C were changed as shown in Table 1.

In Comparative Example 2, a negative electrode active material, negative electrode, and coin battery were produced in the same way as in Inventive Example 1 excepting that only material C used in Inventive Example 1 was used as the negative electrode active substance.

Determination of crystal structure, and evaluation of various charge-discharge performances of the coin battery were performed in the same way as in Inventive Example 1. The result of the determination of crystal structure was the same as in Inventive Example 1. That is, it was confirmed that the alloy phases of the material C of Inventive Examples 2 to 6, and 9 and 10, and Comparative Example 1, 2 and 5 had a crystal structure that undergoes M transformation when occluding lithium ions, and undergoes reverse transformation when releasing lithium ions. The results of the evaluation of various charge-discharge performances of the coin battery were as shown in Table 1.

Inventive Example 7 and Comparative Example 3

In Inventive Example 7, a negative electrode active material, negative electrode, and coin battery were produced in the same way as in Inventive Example 1 excepting that the final chemical composition of the material C was changed to the composition according to Table 1.

In Comparative Example 3, a negative electrode active material, negative electrode, and coin battery were produced in the same way as in Inventive Example 1 excepting that only material C used in Inventive Example 7 was used as the negative electrode active substance.

Determination of crystal structure, and evaluation of various charge-discharge performances of the coin battery were performed in the same way as in Inventive Example 1. The result of the determination of crystal structure was the same as in Inventive Example 1. That is, it was confirmed that the alloy phases of the material C of Inventive Example 7, and Comparative Example 3 had a crystal structure that undergoes M transformation when occluding lithium ions, and undergoes reverse transformation when releasing lithium ions. Results of the evaluation of various charge-discharge performances of the coin battery were as shown in Table 1.

Inventive Example 8 and Comparative Example 4

In Inventive Example 8, the negative electrode active material, negative electrode, and coin battery were produced in the same way as in Inventive Example 1 excepting that the final chemical composition of the material C was changed to the composition listed in Table 1.

In Comparative Example 4, a negative electrode active material, negative electrode, and coin battery were produced in the same way as in Inventive Example 1 excepting that only material C used in Inventive Example 8 was used as the negative electrode active substance.

Determination of crystal structure, and evaluation of various charge-discharge performances of the coin battery were performed in the same way as in Inventive Example 1. According to the determination of crystal structure, the alloy phase changed as follows as charging/discharging was performed. The alloy phase was M phase (2H structure) before initial charging, M phase (2H structure) after initial charging, and a matrix phase ($DO_3$ structure) after initial discharging, and thereafter, the alloy phase underwent M transformation to be transformed into M phase (2H structure) through charging, and became matrix phase ($DO_3$ structure) through discharging. That is, it was confirmed that the negative electrodes of Inventive Example 8 and Comparative Example 4 had an alloy phase that undergoes M transformation when occluding lithium ions which are metal ions, and undergoes reverse transformation when releasing lithium ions. Results of evaluating various charge-discharge performances of the coin battery were as shown in Table 1.

With reference to Table 1, in Inventive Examples 1 to 10, at least material A and material C were contained, and further the mixing ratios thereof were appropriate. As a result of that, the initial discharge capacities and discharge capacities at 20th cycle were not less than 95 mAh/g, and the capacity retention ratios were not less than 80%. Further, the initial Coulomb efficiencies were not less than 50%.

Note that in the Inventive Examples 1 to 3, F2 (=A/C) was 0.01 to 7, and F1 (=B/(A+B+C)) was 0.01 to 0.2. On the other hand, in Inventive Examples 9 and 10, F1 was out of a range of 0.01 to 0.2. For that reason, the discharge capacities (at the initial cycle and after 20 cycles) and the initial Coulomb efficiency were higher in Inventive Examples 1 to 3 than in Inventive Examples 9 and 10.

On the other hand, in Comparative Example 1, the mass ratio of material A/material C was more than 7. For that reason, the discharge capacities at the initial and 20th cycles were less than 95 mAh/g.

Although the negative electrode active materials of Comparative Examples 2 to 4 contained material C, they contained neither material A nor material B. As a result of that, all of the discharge capacities at the initial and 20th cycles, the capacity retention ratios, and the initial Coulomb efficiency were low.

In the negative electrode active material of Comparative Example 5, F1 (mass of material A/mass of material C) was less than 0.01%. For that reason, the discharge capacities at the first and 20th cycles, and the capacity retention ratio were low.

So far, embodiments of the present invention have been described. However, the above described embodiments are merely examples to carry out the present invention. Therefore, the present invention will not be limited to the above described embodiments, and can be carried out by appropriately modifying the above described embodiments within a range not departing from the spirit thereof.

The invention claimed is:

1. A negative electrode active material, comprising material A, and
material C, wherein
a ratio of mass of the material A with respect to mass of the material C in the negative electrode active material is 0.01 to 7:
Material A: carbonaceous powder material in which a ratio of a peak intensity at 1360 cm$^{-1}$ with respect to a peak intensity at 1580 cm$^{-1}$ in the Raman spectrum is not more than 0.5;
Material C: powder material whose main component is active substance made up of an alloy phase containing 10 to 35 at % of Sn, and one or more selected from the group consisting of Ti: 9.0 at % or less, V: 49.0 at % or less, Cr: 49.0 at % or less, Mn: 9.0 at % or less, Fe: 49.0 at % or less, Co: 49.0 at % or less, Ni: 9.0 at % or less, Zn: 29.0 at % or less, Al: 49.0 at % or less, Si: 49.0 at % or less, B: 5.0 at % or less, and C: 5.0 at % or less, with the balance being Cu and impurities.

2. The negative electrode active material according to claim 1, further comprising
material B, wherein
a ratio of mass of the material B with respect to a total mass of the material A, the material B, and the material C in the negative electrode active material is 0.01 to 0.2:
Material B: carbonaceous powder material in which a ratio of a peak intensity at 1360 cm$^{-1}$ with respect to a peak intensity at 1580 cm$^{-1}$ in the Raman spectrum is more than 0.5.

3. A negative electrode comprising the negative electrode active material according to claim 2.

4. A battery comprising the negative electrode according to claim 3.

5. A negative electrode comprising the negative electrode active material according to claim 1.

6. A battery comprising the negative electrode according to claim 5.

* * * * *